(12) United States Patent
Cai et al.

(10) Patent No.: US 8,448,036 B2
(45) Date of Patent: May 21, 2013

(54) HYBRID AUTOMATIC REPEAT REQUEST ROUND TRIP TIME AND ACKNOWLEDGEMENT/NEGATIVE ACKNOWLEDGEMENT REPETITION IN DISCONTINUOUS RECEPTION

(75) Inventors: Zhijun Cai, Irving, TX (US); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 584 days.

(21) Appl. No.: 12/638,762

(22) Filed: Dec. 15, 2009

(65) Prior Publication Data

US 2010/0153804 A1  Jun. 17, 2010

Related U.S. Application Data

(60) Provisional application No. 61/122,915, filed on Dec. 16, 2008.

(51) Int. Cl.
*G06F 11/00* (2006.01)

(52) U.S. Cl.
USPC .......................................... 714/748; 714/749

(58) Field of Classification Search ........................ None
See application file for complete search history.

(56) References Cited

U.S. PATENT DOCUMENTS

| 7,899,003 | B2 * | 3/2011 | Xu | 370/321 |
| 2006/0013257 | A1 * | 1/2006 | Vayanos | 370/473 |
| 2009/0046627 | A1 * | 2/2009 | Xu | 370/328 |
| 2009/0147727 | A1 * | 6/2009 | Tseng | 370/315 |
| 2011/0078530 | A1 * | 3/2011 | Shiizaki et al. | 714/749 |

FOREIGN PATENT DOCUMENTS

| EP | 1228602 B1 | 5/2007 |
| EP | 1885078 A2 | 2/2008 |
| JP | 2003514440 A | 4/2003 |
| WO | 0135580 A1 | 5/2001 |
| WO | 2007007383 A1 | 1/2007 |
| WO | 2007073118 A1 | 6/2007 |
| WO | 2008105419 A1 | 9/2008 |

OTHER PUBLICATIONS

Australian Office Action; Application No. 2009330308; Oct. 25, 2011; 2 pages.
Texas Instruments, et al.; 3GPP TSG-RAN1 Meeting #55; Title: Support of UL ACK/NAK Repetition in Rel-8; Change Request; R1-084650; Prague, Czech Republic; Nov. 10-14, 2008; 7 pgs.
Ericsson; 3GPP TSG-RAN WG2 #63bis; Title: HARQ RTT Timer; R2-085657; Praque, Czech Republic; Sep. 29-Oct. 3, 2008; 3 pgs.

(Continued)

*Primary Examiner* — Christopher McCarthy
(74) *Attorney, Agent, or Firm* — Conley Rose, P.C.; J. Robert Brown, Jr.

(57) ABSTRACT

A method is provided for detecting a hybrid automatic repeat request (HARQ) message. The method comprising setting a round trip time (RTT) based on a time delay associated with acknowledgement (ACK)/negative acknowledgement (NACK) repetitions, and receiving a retransmitted HARQ message when the RTT expires. Also provided is a user equipment (UE) comprising a processor configured to set an RTT based on a time delay associated with ACK/NACK repetitions, and receive a retransmitted HARQ message when the RTT expires.

21 Claims, 4 Drawing Sheets

OTHER PUBLICATIONS

3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pgs.
PCT International Search Report; PCT Application No. PCT/US2009/068096; Apr. 8, 2010; 4 pgs.
PCT Written Opinion of the International Searching Authority; PCT Application No. PCT/US2009/068096; Apr. 8, 2010; 12 pgs.
3GPP TSG-RAN WG2 Meeting #62bis; Agenda Item 6.1.1.3; Discussion & Decision; Clarification on MAC DRX Control; ASUSTeK; R2-083203; Warsaw, Poland; Jun. 30-Jul. 4, 2008; 4 pages.
3GPP TSG-RAN WG2 Meeting #64; Agenda Item 5.4.3; Discussion and Decision; More Considerations on HARQ RTT Timer in DRX; CMCC, CATT, Huawei, RITT, ZTE, Qualcomm Europe; R2-087187; Prague, Czech Republic; Nov. 10-14, 2008; 4 pages.
3GPP TSG-RAN WG2 #64bis; Agenda Item 6.1.1.3; Discussion and Approval; HARQ RTT Timer and N/A Repetition in DRX; Research in Motion Ltd, CMCC; Ljubljana, Slovenia; R2-090569; Jan. 12-16, 2009; 3 pages.
Korean Office Action; Application No. 10-2011-7016614; Jul. 17, 2012; 9 pages.
European Examination Report; Application No. 09795632.0; Sep. 6, 2012; 3 pages.
Mexican Office Action; Application No. MA/a/2011/006448; Sep. 26, 2012; 4 pages.
Australian Notice of Acceptance; Application No. 2009330308; Nov. 22, 2012; 3 pages.
Japanese Office Action; Application No. 2011-542345; Nov. 22, 2012; 10 pages.
Mexican Office Action; Application No. MX/a/2011/006448; Feb. 28, 2013; 4 pages.
European Summons to Attend Oral Proceedings; Application No. 09795632.0; Mar. 6, 2013; 15 pages.
3GPP TSG RAN WG1 #52bis; "ACK/NAK Repetition in EUTRA Uplink"; R1-081372; Shenzhen, China; Mar. 31-Apr. 4, 2008; 2 pages.

* cited by examiner

HYBRID AUTOMATIC REPEAT REQUEST ROUND TRIP TIME AND ACKNOWLEDGEMENT/NEGATIVE ACKNOWLEDGEMENT REPETITION IN DISCONTINUOUS RECEPTION

CROSS-REFERENCE TO RELATED APPLICATIONS

The present application claims priority to U.S. provisional patent application No. 61/122,915 filed Dec. 16, 2008, by Zhijun Cai, et al, entitled "Hybrid Automatic Repeat Request Round Trip Time And Acknowledgement/Negative Acknowledgement Repetition In Discontinuous Reception", which is incorporated by reference herein as if reproduced in its entirety.

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network nodes. When a UE is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a SIP session. The term "user agent" or "UE" can also be used instead to the term "user equipment" or "UE" to refer to similar devices.

In traditional wireless telecommunications systems, transmission equipment in a base station transmits signals throughout a geographical region known as a cell. As technology has evolved, more advanced network access devices have been introduced that can provide services that were not possible previously. These advanced network access devices might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE eNB, or any other devices which can provide a UE with access to other components in a telecommunications system.

For packet data, the signal that carries data between a UE and an access device can have a specific set of frequency, time, and coding parameters and other characteristics that might be specified by the access device. A connection between a UE and an access device that has a specific set of such characteristics can be referred to as a resource. An access device typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
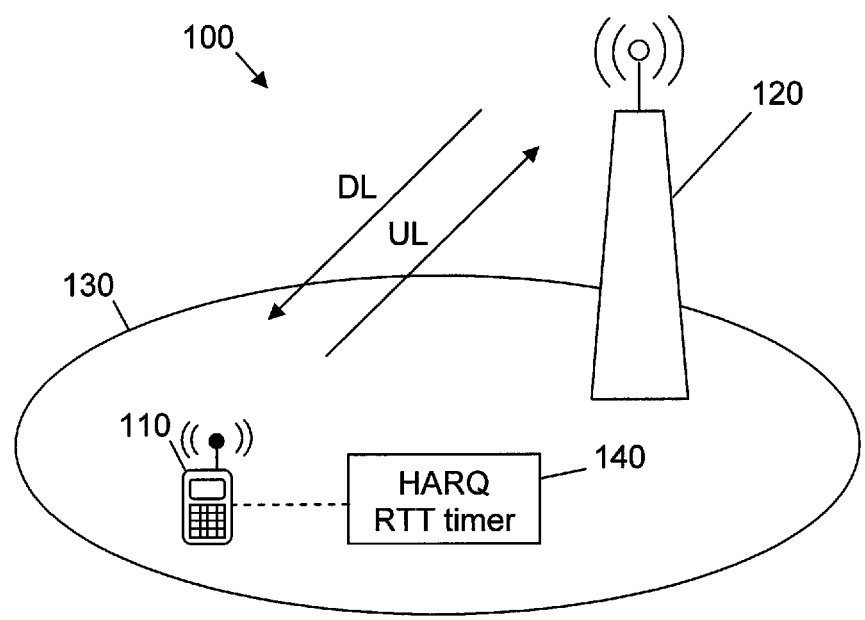
FIG. 1 is a diagram of an embodiment of a wireless communication system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To improve communications reliability, an access device can retransmit a message a plurality of times to a UE and receive an acknowledgement (ACK) or negative acknowledgement (NACK) message from the UE in reply to each message, known as hybrid automatic repeat request (HARQ). Each HARQ message may comprise error detection (ED) information, forward error correction (FEC) information, or both, which may be received and processed by the UE to detect the presence of transmission errors. The UE can reply to the access device with an ACK message when no transmission errors are detected or a NACK message when a transmission error is detected.

Typically, the access device can retransmit the HARQ message in a periodic manner where consecutive HARQ messages are spaced by about a round trip time (RTT) delay. As such, the UE can switch to sleep mode or to a low power operation mode to save battery power during the RTT and wake up or switch to a normal operation mode when a HARQ message is retransmitted. For instance, when the UE receives a HARQ message that has transmission errors, the UE can set a HARQ RTT timer and switch to sleep mode. The UE may also send a NACK to the access device to indicate the unsuccessful reception. When the HARQ RTT timer expires and there is an indication that the data was not successfully received, e.g., a NACK was sent, the UE can wake up and expect to receive a retransmitted HARQ message.

Further, a period of time known as a discontinuous reception (DRX) on-duration can be defined as a periodic duration during which the UE wakes up for the purpose of monitoring a downlink channel from the access device, such as a physical downlink control channel (PDCCH). A DRX cycle is a periodic repetition of the DRX on-duration followed by a possible period of inactivity (i.e., a DRX off-duration). For example, the DRX cycle might be defined to last about 20 milliseconds, and the DRX on-duration might be defined to be about four milliseconds within those 20 milliseconds. If no other activity is going on, the UE will wake up to monitor the PDCCH for about four milliseconds and then switch to sleep mode for about 16 milliseconds.

In some cases, the DRX on-duration may start and the RTT may expire at about the same time. As such, the UE may monitor the PDCCH and receive the HARQ message at about the same time or at some overlapping time. However, in other cases, the RTT may expire during the DRX off-duration and before the start of the DRX on-duration. Accordingly, the UE may wake up during the DRX off-duration to receive the retransmitted HARQ message. For example, if the HARQ RTT timer is initiated at the end of a DRX on-duration, the HARQ RTT timer may expire during the next DRX off-duration when the UE may be inactive or in a low power mode. In this case, the UE may wake up to receive the retransmitted HARQ message.

The RTT can be defined according to different communication technologies. For example, according to the Third Generation Partnership Project (3GPP) Radio Access Network 2(RAN2) #63-BIS document, the RTT is set equal to about eight milliseconds for frequency-division duplexing (FDD). In some systems, the UE can reply to each received HARQ message with a plurality of repeated ACK/NACK messages or sub-frames to provide improved feedback to the access device, for example as suggested in the 3GPP RAN1 #54-BIS document. The number of repeated ACK/NACKs may be equal to about two, about four, about six, or more depending on the radio conditions. Repeating the ACK/NACK sub-frames is especially advantageous in bad radio conditions. For instance, the number of repeated ACK/NACKs can be equal to about two in normal radio conditions or to about six in worse radio conditions.

The access device can retransmit the HARQ message to the UE after receiving all the repeated ACK/NACK sub-frames. In this case, the retransmitted HARQ message can arrive at the UE after the total time required for transporting the repeated ACK/NAK sub-frames. The total time may comprise the RTT for a single ACK/NACK reply in addition to the time delay for the additional ACK/NACK sub-frames. Since currently, the UE is configured to wake up after the RTT for a single ACK/NACK reply and go back to sleep mode afterwards, the UE may be back in sleep mode and miss detecting the HARQ message in the case of repeated ACK/NACK sub-frames. Further, waking up without receiving the retransmitted HARQ message wastes some of the UE's battery power unnecessarily.

Disclosed herein are systems and methods for improving detection of the HARQ messages in the case of repeated ACK/NACK sub-frames. Specifically, by accounting for the time delay associated with the number of repeated ACK/NACKs, the UE can wake up on time to receive the retransmitted HARQ message. The UE may wake up after the RTT for a single ACK/NACK reply in addition to the time delay to account for the additional ACK/NACK sub-frames. Accordingly, the UE may wake up after an extended RTT, which may be equal to the sum of the RTT for a single ACK/NACK reply and the number of repeated ACK/NACK sub-frames minus one. As used herein, discussion of modifying the RTT time based on the ACK/NACK repetitions is intended to include extending the RTT time based on the delay time associated with the additional ACK/NACK sub-frames. The HARQ RTT timer that signals the UE to wake-up may be set to expire after the extended RTT. As such, the UE does not miss receiving the HARQ message and at least some of the UE's battery power is saved by not waking up early.

FIG. 1 illustrates an embodiment of a wireless communication system 100, for instance as described in the Third Generation Partnership Project (3GPP). FIG. 1 is exemplary and may have other components or arrangements in other embodiments. The wireless communication system 100 may comprise at least one UE 110 and an access device 120. The UE 110 may wirelessly communicate, via a wireless link, with the network access device 120. The wireless link may conform to any of a plurality of telecommunications standards or initiatives, such as those described in the 3GPP, including LTE, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including Interim Standard 95 (IS-95), Code Division Multiple Access (CDMA) 2000 standards 1xRTT or 1xEV-DO. The wireless link may also be compatible with other standards, such as those described by the Institute of Electrical and Electronics Engineers (IEEE), or other industry forums, such as the WiMAX forum.

The access device 120 may be an eNB, a base station, or other components that promote network access for the UE 110. The access device 120 may communicate with any UE 110, which may be within the same cell 130, directly via a direct link. For instance, the direct link may be a point-to-point link established between the access device 120 and the UE 110 and used to transmit and receive signals between the two. The UE 110 may also communicate with at least a second UE 110 within the same cell. Additionally, the access device 120 may also communicate with other components or devices to provide for the components of the wireless communication system 100 access to other networks.

The UE 110 and the access device 120 may wirelessly communicate via at least one downlink (DL) channel, at least one uplink (UL) channel, or both. The downlink and uplink channels may be physical channels, which may be statically, semi-statically, or dynamically allocated network resources. For instance, the downlink and uplink channels may comprise at least one physical downlink shared channel (PDSCH), at least one physical downlink control channel (PDCCH), at least one physical uplink shared channel (PUSCH), at least one physical uplink control channel (PUCCH), or combinations thereof. In an embodiment, the downlink and uplink channels may be established using FDD, where signals are received and transmitted at different frequencies. Additionally or alternatively, the downlink and uplink channels may be established using time-division, where the signals may be transmitted, received, or both at different transmission time intervals (TTIs).

In an embodiment, the access device 120 may transmit a plurality of HARQ messages to the UE 110 over the downlink in a periodic manner at about a fixed RTT or about equal time intervals. In some systems, the UE 110 may detect each HARQ message periodically at about the RTT and reply with a single ACK/NACK message over the uplink. Additionally, to save battery power, the UE 110 may switch to sleep mode when no HARQ message is expected and may wake up about every RTT or at the expiration of a HARQ RTT timer 140, which may be coupled to the UE 110, to detect the HARQ message and transmit the ACK/NACK message. As discussed above, however, in next generation systems the UE 110 may reply to each detected HARQ message with a plurality of ACK/NACK sub-frames instead of a single ACK/NACK message to improve feedback and error correction. Specifically, the UE 110 may repeatedly transmit an ACK/NACK sub-frame a predetermined number of times. The repeated ACK/NACK sub-frames may be transported at about equal time delays. For instance, the time for transporting each repeated ACK/NACK sub-frame may be about one millisecond in the present embodiment, but may be more or less in other embodiments. The access device 120 may receive the repeated ACK/NACK sub-frames and then, in the case of NACK sub-frames, retransmit the HARQ message accordingly.

In an embodiment, the number of repeated ACK/NACK sub-frames may be based on the radio conditions for the wireless communication system 100. The ACK/NACK repetition may be set equal to about two, about four, about six, or more. For instance, the number of ACK/NACK repetition may be set to about one for good radio conditions and increased to about four, about six, or more, as radio conditions get worse. In some embodiments, the UE 110 may receive an updated request to change the ACK/NACK repetition setting, for example from the access device 120. Accordingly, the access device 120 knows the number of repeated ACK/NACK sub-frames to expect from the UE 110.

Since the access device 120 waits for receiving the repeated ACK/NACK sub-frames before transmitting the next HARQ message, the RTT or the time intervals between the retransmitted HARQ messages are increased relative to the number of ACK/NACK sub-frames being transmitted. The increased or extended RTT may comprise the round trip time for receiving the HARQ message which accounts for one ACK/NACK sub-frame, as well as the time delay associated with, for example transporting or otherwise providing, the remaining ACK/NACK sub-frames. To detect the HARQ message appropriately, the UE 110 should wake up at about the extended RTT.

Figure 2:
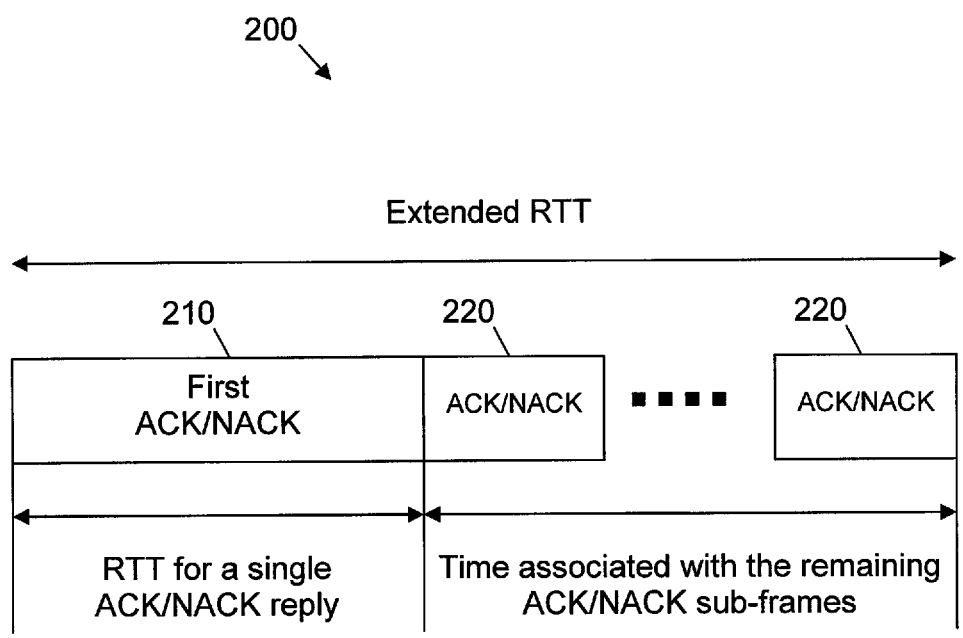
FIG. 2 is a diagram of an embodiment of an extended round trip time according to an embodiment of the disclosure.

FIG. 2 illustrates an embodiment of an extended RTT 200. The extended RTT 200 includes the time delay to receive the HARQ message, which takes into account the first ACK/NACK sub-frame 210, and as well as the additional time for transporting or otherwise providing each of the additional ACK/NACK sub-frames 220. Accordingly, the extended RTT 200 may comprise the RTT for receiving the HARQ message including the time associated with a single ACK/NACK reply (as well as the processing delay, transmission delay, etc.) and the time associated with the additional ACK/NACK sub-frames. The time associated with the remaining ACK/NACK sub-frames may be set equal to the time associated with all the repeated ACK/NACK sub-frames minus the time associated with one ACK/NACK sub-frame to exclude the first ACK/NACK sub-frame which is already accounted for.

The UE 110 may wake up using the HARQ RTT timer 140, which may be set to expire after about the extended RTT 200. For example, in a system compatible with the RAN2 #63-BIS specifications and assuming about one millisecond delay for transporting each ACK/NACK sub-frame, the HARQ RTT timer 140 may be set to expire after about a predetermined number (k) of milliseconds (ms) in addition to the ACK/NACK repetitions time factor (also referred to as N-ANRep) minus one. In an embodiment, k may be equal to eight. The extended RTT 200 can be expressed such as:

$$RTT = k\,ms + N\text{-}ANRep - 1$$

As an example, the HARQ RTT timer 140 may be set to 8 milliseconds, meaning the UE 110 can expect a retransmission 8 milliseconds after the current downlink reception. If the ACK/NACK is enabled with a repetition factor of 6, the UE can expect a retransmission 8+6−1=13 milliseconds after the current downlink reception.

In an embodiment, the UE 110 may use other timers in addition to the HARQ RTT timer 140 to further preserve the battery power. For instance, the UE 110 may use another timer such as a DRX timer in addition to the HARQ RTT timer 140, expanded as described above, to receive a PDCCH intermittently. Accordingly, the UE 110 may wake up to receive the PDCCH when the DRX timer expires, which signals the start of the DRX on-duration. The UE 110 may also wake up to receive the HARQ message when the HARQ RTT timer 140 expires, which signals the retransmission of the HARQ message. When the DRX timer and the HARQ RTT timer 140 expire at about the same time or at near times, the UE 110 may wake up to receive the PDCCH. On the other hand, when the DRX timer expires before the HARQ RTT timer 140, the UE 110 may wake up to receive the PDCCH.

Figure 3:
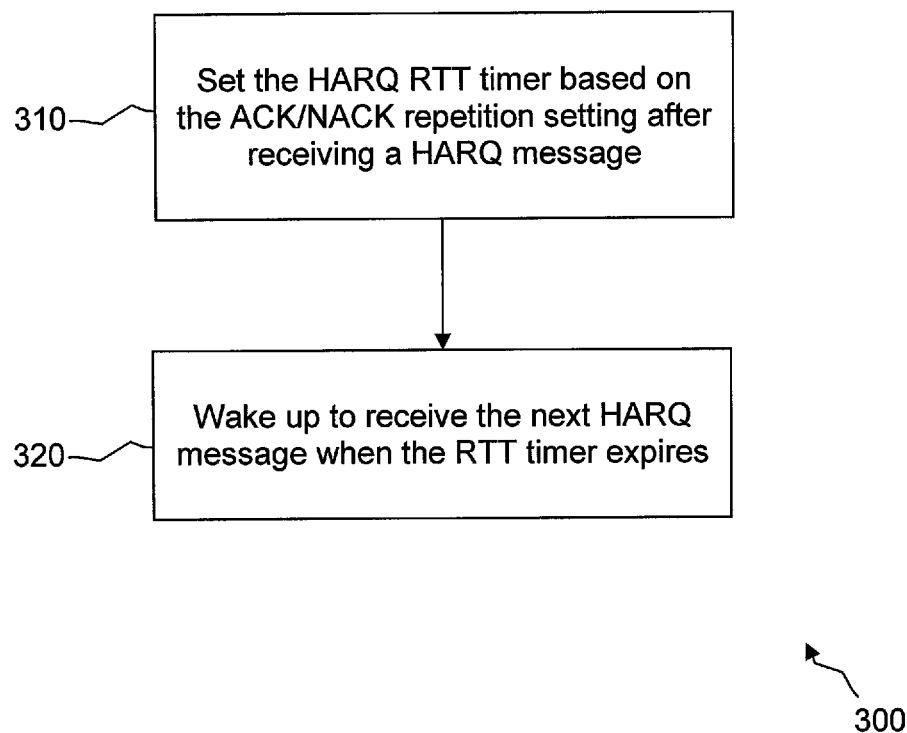
FIG. 3 is a flowchart of a method for detecting a hybrid automatic repeat request message with acknowledgement/negative acknowledgement repetition according to an embodiment of the disclosure.

FIG. 3 illustrates an embodiment of a method 300 for detecting a HARQ message in the case of the ACK/NACK repetition. At block 310, the UE 110 may set the HARQ RTT timer 140 according to the ACK/NACK repetition setting after receiving a HARQ message. The ACK/NACK repetition setting may be configured or updated based on the radio conditions. For instance, in normal radio conditions where there may be two ACK/NACK frames, the RTT time may be set equal to about nine milliseconds, which includes about eight milliseconds for the HARQ RTT including the first ACK/NACK sub-frame, and about one millisecond for transmitting or transporting the second ACK/NACK sub-frame. Alternatively, the RTT time may be set equal to about 11 or about 13 milliseconds in less favorable radio conditions, which might include four or six repeated ACK/NACK frames, about eight milliseconds for the HARQ RTT including the first ACK/NACK sub-frame, and about three or five milliseconds for transporting the three or five additional ACK/NACK sub-frames. Once the HARQ RTT timer 140 is set, the UE 110 may switch to sleep mode to save some battery power if no other activities are scheduled.

At block 320, the UE 110 may wake up to receive the next retransmitted HARQ message when the HARQ RTT timer 140 expires. The UE 110 may wake up during an active time, such as a DRX on-duration, or during an inactive time, such as a DRX off-duration. The UE 110 may detect and process the HARQ message, and then transmit the repeated ACK/NACK sub-frames.

Figure 4:
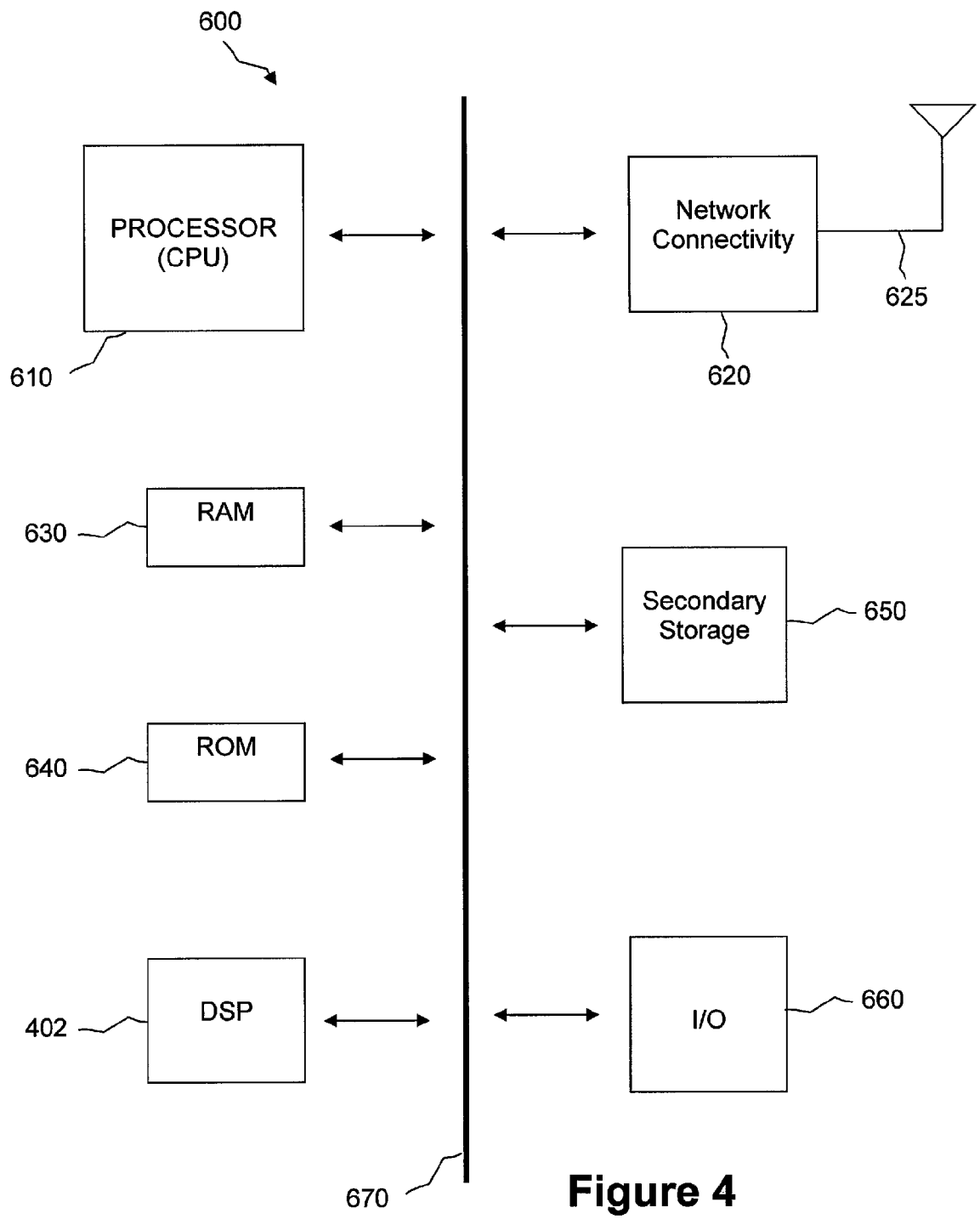
FIG. 4 illustrates a processor and related components suitable for implementing the several embodiments of the present disclosure.

The UE 110 and other components described above might include a processing component that is capable of executing instructions related to the actions described above. FIG. 4 illustrates an example of a system 600 that includes a processing component 610 suitable for implementing one or more embodiments disclosed herein. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a DSP 402. Although the DSP 402 is shown as a separate component, the DSP 402 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input or output devices. Also, the transceiver 625 might be considered to be a component of the I/O devices 660 instead of or in addition to being a component of the network connectivity devices 620.

The following are incorporated herein by reference for all purposes: 3GPP RAN2 #63-BIS and 3GPP RAN1 #54-BIS.

In an embodiment, a method is provided for detecting a HARQ message. The method comprising setting an RTT based on a time delay associated with ACK/NACK repetitions.

In another embodiment, a UE is provided. The UE comprising a processor configured to set an RTT based on a time delay associated with ACK/NACK repetitions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for detecting a hybrid automatic repeat request (HARQ) message, comprising:
    setting a round trip time (RTT) based on a time delay associated with receiving a HARQ message;
    transmitting a plurality of repeated acknowledgement (ACK)/negative acknowledgement (NACK) sub-frames in response to receiving the HARQ message;
    receiving a request to update the predetermined number of ACK/NACK sub-frames; and
    updating the predetermined number of ACK/NACK sub-frames based on radio conditions,
    wherein the RTT is set equal to a predefined time in addition to a total time delay associated with transmitting the plurality of repeated ACK/NACK sub-frames,
    wherein the plurality of repeated ACK/NACK sub-frames is equal to a predetermined number of ACK/NACK sub-frames to be transmitted in response to each received HARQ message.

2. The method of claim 1 further comprising receiving the HARQ message when the RTT expires.

3. The method of claim 1 further comprising, when the HARQ retransmitted, switching to a sleep mode when the RTT is set and waking up when the RTT is expired to receive the retransmitted HARQ message.

4. The method of claim 3 further comprising waking up during a discontinuous reception (DRX) off-duration when the RTT is expired.

5. The method of claim 1, wherein the plurality of repeated ACK/NACK sub-frames is a predetermined number equal to one of two, four, or six repeated ACK/NACK sub-frames to be transmitted in response to each received HARQ message.

6. The method of claim 1, wherein the total time delay comprises the time for transporting the plurality of repeated ACK/NACK sub-frames minus the time associated with transmitting one ACK/NACK sub-frame.

7. The method of claim 6, wherein the predefined time is equal to eight milliseconds, and wherein the time delay for transporting one ACK/NACK sub-frame is equal to one millisecond.

8. The method of claim 7, wherein communications are established using frequency-division duplexing (FDD).

9. The method of claim 6, wherein the predefined time is equal to 4+m milliseconds, wherein m is a pre-determined integer.

10. The method of claim 9, wherein communications are established using time-division duplexing (TDD).

11. A user equipment (UE) comprising:
    a processor configured to:

set a round trip time (RTT) based on a time delay associated with receiving a HARQ message;

transmit a plurality of repeated acknowledgement (ACK)/negative acknowledgement (NACK) sub-frames in response to receiving the HARQ message;

receive a request to update a predetermined number of ACK?NACK sub-frames; and update the predetermined number of ACK/NACK sub-frames based on radio conditions associated with the UE, wherein the RTT is set equal to a predefined time in addition to a total time delay associated with transmitting the plurality of repeated ACK/NACK sub-frames, wherein the plurality of repeated ACK/NACK sub-frames is equal to the predetermined number of ACK/NACK sub-frames, and wherein the processor is configured to transmit the predetermined number of ACK/NACK sub-frames in response to each HARQ message the processor receives.

12. The UE of claim 11, wherein the HARQ message is received when the RTT is expired.

13. The UE of claim 11, wherein when the HARQ message is retransmitted, the retransmitted HARQ message is received after waking from a sleep mode when the RTT expires, and wherein the RTT is set before switching to the sleep mode.

14. The UE of claim 13, wherein switching to the sleep mode promotes saving battery power.

15. The UE of claim 13, wherein the retransmitted HARQ message is received when the RTT is expired during a discontinuous reception (DRX) off-duration.

16. The UE of claim 11, wherein the plurality of repeated ACK/NACK sub-frames is a predetermined number equal to one of two, four, or six repeated ACK/NACK sub-frames that the processor is configured to transmit in response to each received HARQ message.

17. The UE of claim 16, wherein the total time delay comprises the time for transporting the plurality of repeated ACK/NACK sub-frames minus the time associated with transmitting one ACK/NACK sub-frame.

18. The UE of claim 17, wherein the predefined time is equal to eight milliseconds, and wherein the time delay for transporting one ACK/NACK sub-frame is equal to one millisecond.

19. The UE of claim 18, wherein communications are established using frequency-division duplexing (FDD).

20. The UE of claim 17, wherein the predefined time is equal to 4+m milliseconds, and the value of m is dependent on the configurations.

21. The method of claim 20, wherein communications are established using time-division duplexing (TDD).

* * * * *

UNITED STATES PATENT AND TRADEMARK OFFICE
CERTIFICATE OF CORRECTION

PATENT NO. : 8,448,036 B2  
APPLICATION NO. : 12/638762  
DATED : May 21, 2013  
INVENTOR(S) : Zhijun Cai et al.

Page 1 of 1

It is certified that error appears in the above-identified patent and that said Letters Patent is hereby corrected as shown below:

In the Claims:

Claim 11, Column 9, Line 7, replace "ACK?NACK" with -- "ACK/NACK" --

Signed and Sealed this
Twentieth Day of August, 2013

Teresa Stanek Rea
*Acting Director of the United States Patent and Trademark Office*